Oct. 27, 1964    O. HOULE    3,154,285
FUEL DERICHMENT VALVE
Filed June 7, 1962    2 Sheets-Sheet 1
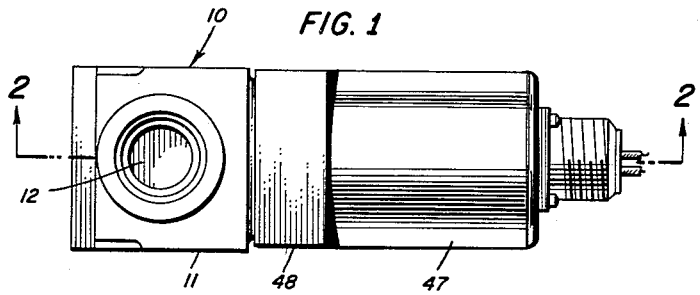
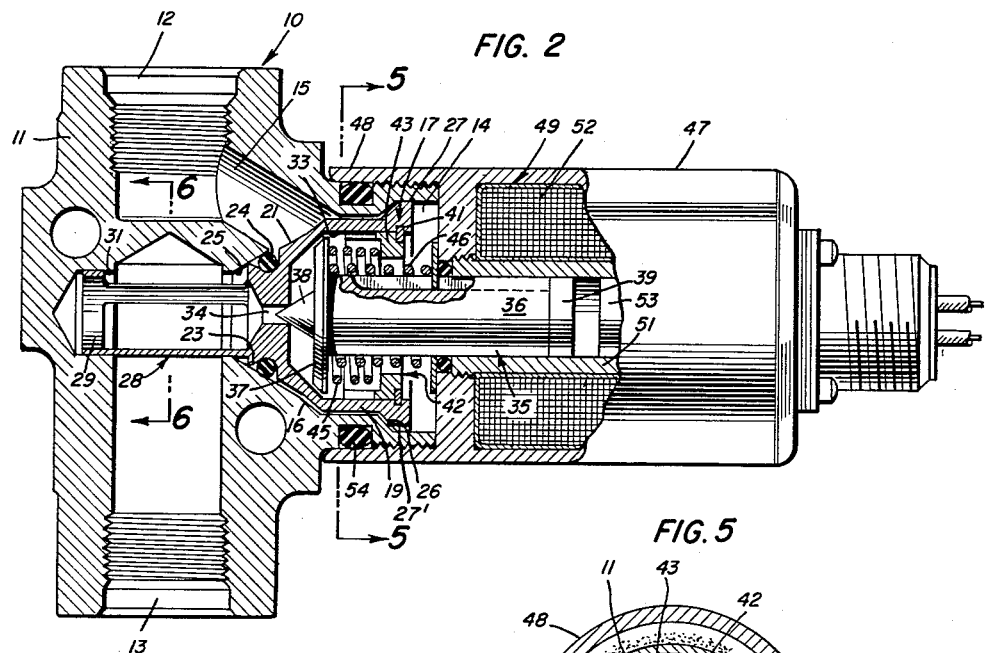
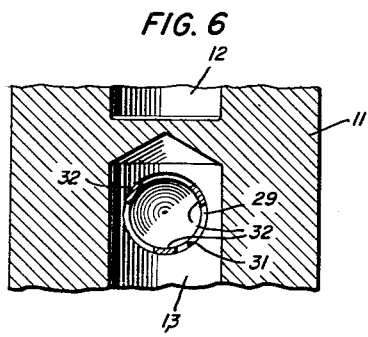
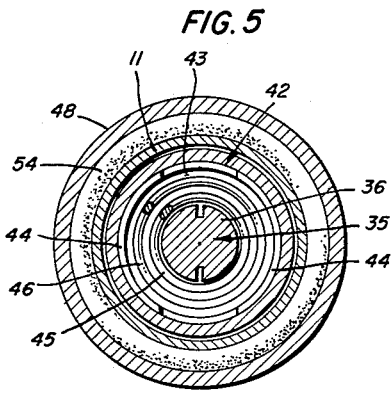
INVENTOR
Omer Houle
BY Claude Funkhouser
ATTORNEY Oct. 27, 1964

O. HOULE 3,154,285

FUEL DERICHMENT VALVE

Filed June 7, 1962

INVENTOR
*Omer Houle*

BY *Claude Funkhouser*
ATTORNEY

United States Patent Office 3,154,285
Patented Oct. 27, 1964

1

3,154,285
FUEL DERICHMENT VALVE
Omer Houle, Wilmington, Mass., assignor, by mesne assignments, to the United States of America as represented by the Secretary of the Navy
Filed June 7, 1962, Ser. No. 200,895
1 Claim. (Cl. 251—30)

This invention relates to valves and more particularly to a new and improved pressure fluid operated, electromagnetically controlled, valve.

More specifically, the device of the present invention is adapted for use with missile launching jet aircraft to provide means for preventing the injection of excess fuel into the combustion chamber thereof during a missile launching operation. The device comprises a unitary structure including an electromagnet assembly and a valve assembly constructed and arranged to be interposed in a pressure fluid distributing system so that fuel may be delivered to the combustion chamber of the jet engine according to the position of the valve means. For example, upon missile firing or launching operations, the amount of oxygen passing through the aircraft jet engine is greatly reduced due to the presence of missile exhaust gases. The invention, therefore, is constructed and arranged in such a manner as to reduce the amount of fuel normally delivered to the engine in order to maintain a combustible fuel-air mixture during such missile launching operations.

In the design of such valve structure, it has been the object to reduce their construction and operational characteristics, and to reduce the weight thereof to a minimum in order that such valve arrangements may be more suitable for use in missile launching aircraft. It is believed that in the device constructed in accordance with the present invention, this design objective has been obtained in higher degree than heretofore. The invention contemplates a construction characterized by relative smallness of size, lightness of weight, and by a relatively small number of moving parts. In the latter connection, it is proposed to utilize relatively light spring means to perform the several functions of extending and maintaining the electro-magnetic plunger in sealing engagement with port means formed in the main control valve element, the main control valve in sealing engagement with the valve casing, and urging the main valve element and the plunger to their initial or normal position.

Another object of the invention is to provide a new and improved fuel control valve suitable for use in missile launching aircraft fluid distributing systems.

Still another object of the invention is to provide a valve structure wherein means are employed for reducing the injection of fuel into the combustion chamber of a missile launching aircraft jet engine.

A further object of the invention is to provide a fuel control valve for reducing the amount of fuel delivered to the jet engine of a missile launching aircraft in order to maintain a combustible fuel-air mixture therefor.

A still further object of the invention is to provide a new and improved pressure fluid operated electromagnetically controlled valve which is economical to manufacture and which provides all the desired characteristics of durability during operation.

Other objects and many of the attendant advantages of this invention will be readily appreciated as the same becomes better understood by reference to the following detailed description when considered in connection with the accompanying drawings wherein:

FIG. 1 is a plan view of the valve of the present invention;

2

FIG. 2 is an enlarged sectional view of the valve of FIG. 1, taken substantially on the line 2—2 of FIG. 1, illustrating the valve in an initial or closed position;

FIG. 5 is an enlarged sectional view taken substantially on the line 5—5 of FIG. 2;

FIG. 6 is a fragmentary section view taken on the line 6—6 of FIG. 2;

Figure 3:
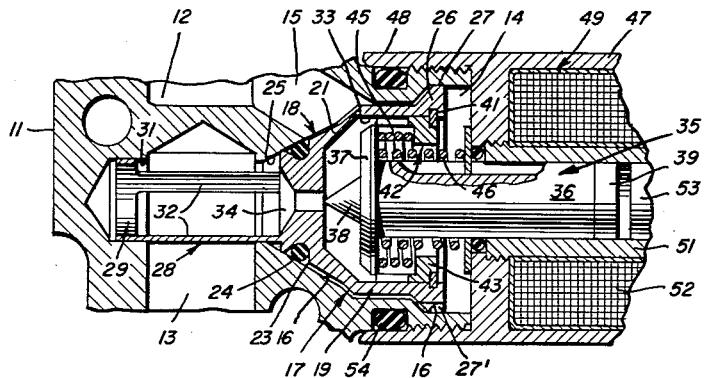
FIG. 3 is a fragmentary section view of the valve of FIG. 2, illustrating the pilot valve moved out of engagement with the port means in the main valve element.

Referring now to the drawing and more particularly to FIGS. 1 and 2, the valve constructed in accordance with the present invention is indicated generally by the reference character 10 and comprises a body 11 having an inlet passage 12 and an outlet passage 13. It will be understood that the passage 12 communicates with a source of fluid under pressure such, for example, as a fuel pump in an aircraft engine assembly, the outlet passage being connected to a device which utilizes pressure fluid, such, for example, as an aircraft engine burner. The body or casing 11 further includes a chamber 14, communicating, for example, with the passage 12, as by an inclined passage 15.

Figure 4:
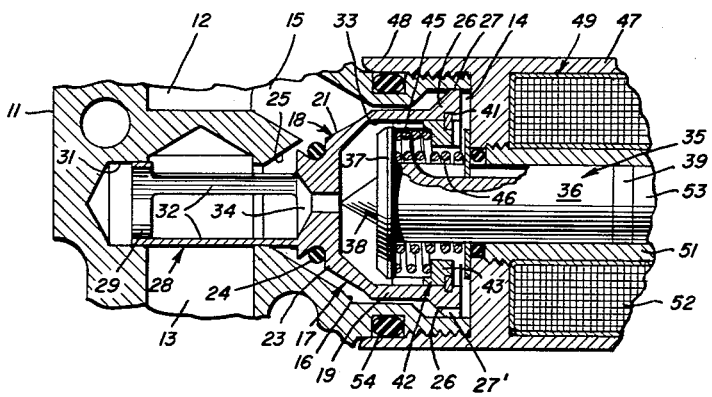
FIG. 4 is a view similar to FIG. 3, illustrating the main valve element moved out of engagement with the valve casing.
Figure 7:
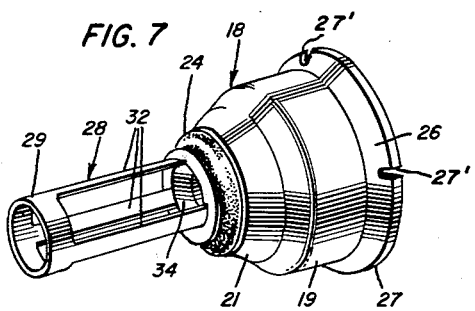
FIG. 7 is a detail view of the main valve element alone.
Figure 8:
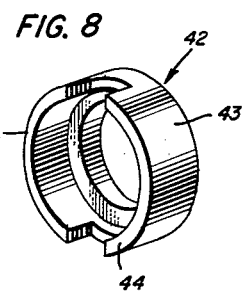
FIG. 8 is a detail view of the main valve actuator alone.

The body 11 is provided with a bore 16 to receive the valve mechanism indicated generally by the reference character 17, which mechanism is arranged perpendicular to the plane of the passages 12 and 13, and axially of the chamber 14 in a manner to communicate the high pressure passages 12 and 13 with the chamber 14 through the valve mechanism 17. The main control valve 18 of the aforesaid valve mechanism, as best shown on FIGS. 2 and 7, comprises a straight walled cylindrical portion 19 having a frusto-conical portion 21 formed at one end. An annular groove 23 in said conical portion receives an O-ring 24, or any other type of sealing element, which element is normally in sealing engagement with a seat 25 formed in bore 16, the other end of straight portion 19 being flared outwardly as as 26 and terminating in a flange portion 27 formed with notches 27'. The main valve element 18 is further provided with a guide or support 28 comprising an annular ring 29 slidably disposed in counterbore 31 in communication and axially aligned with bore 16 in casing 11. The ring 29 is provided with a plurality of mutually spaced arms 32 connected to the portion 22 of the main valve 18 in any conventional manner, whereupon the control valve 18 and ring 29 move as a unit. Centrally disposed in the main valve 18 is a bore 33 and a port 34 in communication with passages 12–13 and the chamber 14, as best shown on FIGS. 2, 3 and 4.

Reciprocable within the bore 33 in main valve 18 is a plunger indicated generally by the reference character 35, which comprises a rod or shaft 36 having a disc like flange 37 formed on one end and further formed with a needle or pilot valve 38 normally in sealing engagement with port 34, FIG. 2, the other end of the shaft being provided with a head 39.

Disposed within the bore 33 and secured to the main valve 18 as by a retaining ring 41, or in any other conventional manner, is a segmented collar indicated generally by the numeral 42 and comprising an annular member 43 provided with a pair of arcuate stop engaging segments 44, as best shown in FIG. 5 and adapted to be engaged by the disc flange or stop 37 carried by plunger 35 to actuate the main valve 18, as will be hereinafter more fully described. It will be understood, however, that after the plunger has been moved springs 45 and 46 return the valves to a seated condition.

Spring 46 surrounds the plunger and at one end contacts the solenoid casing and at the other end contacts the disc shoulder 37 to bias the plunger and its integral needle valve 38 to a closed position. This urges the main valve 17 to closing position. The second and outer spring 45 also has one end disposed against the stop or disc flange 37 and the other end against the segmented collar 42. This spring acts against the flange 37 and within the confines of the main valve to urge the plunger and its needle valve 38 to close the port 34 of the main valve. The spring 45 is a stiffer spring than the spring 46 and will upon de-energization of the solenoid return the needle valve 38 to closed position before the spring 46 closes the main valve. The closing of the main valve is assisted by pressure on the solenoid side of the disc flange 37 after the port 34 is closed.

As more clearly shown on FIG. 2 a casing 47 is mounted on the body 11 of the valve, as by a sleeve 48 in threaded engagement with the body and in axial alignment with the valve 18 and plunger 19. Disposed within the casing is a solenoid structure 49 comprising a sleeve 51 surrounded by a solenoid winding or coil 52 and having a fixed element or core 53 therein. The head 39 of the plunger 35 is slidably within the sleeve 51 and operates the movable element or core of the solenoid.

It will be noted on FIG. 2 of the drawings that the portions 19 and 21 of the main valve 18 have a relatively loose fit in the bore 16 of body 11 and that the flared portion 27 is formed, in a well known manner, with notches 27′ to allow a limited flow of pressure fluid from inlet 12 into chamber 14, it being further noted that a sealing ring such, for example, as an O-ring 54 provides a sealing connection between the sleeve 48 on casing 47 and body 11 of the valve 10 to prevent leakage of pressure fluid from chamber 14.

In the operation of the valve mechanism, the parts normally assume the position illustrated in FIG. 2. Thus the high pressure fuel in inlet line 12 leaks behind main valve 18 and together with springs 45 and 46, maintains the valve 18 in a closed condition which condition exists prior to firing of the missile from the launching aircraft. Upon firing of the missile, however, solenoid 49 is activated moving plunger disc poppet 37 in a direction toward the segments 44, whereupon the needle valve 38 on plunger 35 is unseated from port 34 in the main valve 18 thereby opening the port and reducing the pressure behind the main valve. As the plunger 35 uncovers the port 34 and continues to move, the disc like flange 37 carried thereby engages the segments 44 on the actuating device 42 carried by valve 18 and thus the valve 18 is moved to a position, as shown on FIG. 4, and the fuel is diverted to pump inlet and the F/A ratio is maintained at a combustible level. When the solenoid 49 is deactivated, the springs 45 and 46 return the valve mechanism to its seated position, FIG. 2.

Obviously, many modifications and variations of the present invention are possible in the light of the above teachings. It is, therefore, to be understood that within the scope of the appended claims the invention may be practiced otherwise than as specifically described.

What is claimed is:

A valve mechanism including a casing having a high pressure fuel inlet and a low pressure fuel outlet, a centrally disposed recess in the casing in direct communication with said inlet and terminating in a bore in communication with said outlet, said bore being formed with a valve seat, a main valve normally in sealing engagement with the valve seat of said bore, said main valve being formed with an internal pressure chamber, means for admitting pressure fluid from said inlet to said internal pressure chamber, said main valve being further foromed with a port in communication with said internal pressure chamber and with the outlet through said bore, guide means carried by said main valve and slidably mounted in said bore and movable with said main valve, a solenoid mounted on the casing, an operating plunger adapted to be actuated by said solenoid, said plunger being formed at its free end with a conical needle valve adapted to seat on and close the port of said main valve, said plunger being further formed with a disc like flange adjacent said conical valve, a coil spring disposed about said plunger and having one end in contact with the casing, the other end engaging said disc like flange to bias said plunger in main valve closing position, a segmented collar carried by said main valve to be engaged by said disc like flange upon movement of said plunger in excess of a predetermined amount, said plunger moving the main valve out of sealing engagement with the casing, and a second coil spring on said plunger spaced from and outward of said first spring, said second spring engaging said disc like flange and said collar to bias said conical needle valve into closing contact with said main valve port.

References Cited in the file of this patent
UNITED STATES PATENTS

| | | |
|---|---|---|
| 731,363 | Henderson | June 16, 1903 |
| 754,547 | Desmond | Mar. 15, 1904 |
| 2,575,272 | Harris | Nov. 13, 1951 |
| 2,673,706 | Matteson | Mar. 30, 1954 |
| 2,745,628 | Carlson | May 15, 1956 |
| 2,968,464 | Olson | Jan. 17, 1961 |
| 2,990,155 | Selinder | June 27, 1961 |